United States Patent
Himmelmann

(10) Patent No.: US 10,718,598 B2
(45) Date of Patent: Jul. 21, 2020

(54) SERIES HYBRID ARCHITECTURE FOR AN UNMANNED UNDERWATER VEHICLE PROPULSION SYSTEM

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 69 days.

(21) Appl. No.: 15/631,229

(22) Filed: Jun. 23, 2017

(65) Prior Publication Data

US 2018/0372465 A1    Dec. 27, 2018

(51) Int. Cl.
*F42B 19/24* (2006.01)
*F42B 19/22* (2006.01)
(Continued)

(52) U.S. Cl.
CPC ............ *F42B 19/24* (2013.01); *B60L 15/20* (2013.01); *B60L 50/13* (2019.02); *B60L 50/61* (2019.02); *B63G 8/08* (2013.01); *B63G 8/12* (2013.01); *F42B 19/22* (2013.01); *F42B 19/30* (2013.01); *H02K 7/14* (2013.01); *H02K 7/1823* (2013.01); *H02K 11/33* (2016.01); *H02P 9/48* (2013.01); *H02P 27/024* (2016.02); *H02P 27/06* (2013.01); *B60L 2200/32* (2013.01); *B60L 2210/30* (2013.01); *B60L 2210/40* (2013.01); *B60L 2240/12* (2013.01); *B60L 2260/26* (2013.01); *B63G 8/001* (2013.01); *B63G 2008/002* (2013.01); *H02P 25/02* (2013.01)

(58) Field of Classification Search
USPC ................. 290/10, 40 C, 54; 307/21, 25
See application file for complete search history.

(56) References Cited

U.S. PATENT DOCUMENTS 4,613,279 A * 9/1986 Corren .................... F03B 3/126
                                                     290/54
4,661,714 A * 4/1987 Satterthwaite ......... B63H 23/24
                                                     290/4 R
(Continued)

FOREIGN PATENT DOCUMENTS

EP        2928068      10/2015
JP      2009137411       6/2009

OTHER PUBLICATIONS

Peters, Jonathan A., Summary of Recent Hybrid Torpedo Powerplant Studies, Technical Report No. 07-004, Dec. 2007, Applied Research Laboratory.
(Continued)

*Primary Examiner* — Pedro J Cuevas
(74) *Attorney, Agent, or Firm* — Carlson, Gaskey & Olds, P.C.

(57) ABSTRACT

A propulsion system for an unmanned underwater vehicle includes a turbine engine, a generator mechanically coupled to an output shaft of the turbine engine, an electrical motor mechanically decoupled from the turbine engine and electrically coupled to the generator via a power bus architecture, and a propulsor mechanically coupled to a rotational output of the electrical motor. The power bus architecture includes a pair of AC buses and a DC bus.

5 Claims, 3 Drawing Sheets

(51) Int. Cl.
| | |
|---|---|
| *F42B 19/30* | (2006.01) |
| *B60L 50/13* | (2019.01) |
| *B60L 15/20* | (2006.01) |
| *B60L 50/61* | (2019.01) |
| *B63G 8/08* | (2006.01) |
| *B63G 8/12* | (2006.01) |
| *H02K 7/14* | (2006.01) |
| *B63G 8/00* | (2006.01) |
| *H02K 11/33* | (2016.01) |
| *H02P 27/024* | (2016.01) |
| *H02K 7/18* | (2006.01) |
| *H02P 9/48* | (2006.01) |
| *H02P 27/06* | (2006.01) |
| *H02P 25/02* | (2016.01) |

(56) References Cited

U.S. PATENT DOCUMENTS

| | | | | |
|---|---|---|---|---|
| 4,743,828 | A | 5/1988 | Jahns et al. | |
| 5,301,096 | A * | 4/1994 | Klontz | H01F 38/14 363/37 |
| 5,568,023 | A * | 10/1996 | Grayer | B60K 6/30 318/139 |
| 5,684,690 | A * | 11/1997 | Levedahl | B63H 23/24 290/4 R |
| 5,899,411 | A * | 5/1999 | Latos | B64D 33/00 244/53 A |
| 6,109,863 | A * | 8/2000 | Milliken | F03B 17/065 415/1 |
| 6,150,731 | A * | 11/2000 | Rinaldi | B63H 21/17 290/1 A |
| 6,175,163 | B1 * | 1/2001 | Rinaldi | B63H 21/17 290/1 A |
| 6,531,788 | B2 * | 3/2003 | Robson | F03B 17/061 290/42 |
| 6,683,389 | B2 * | 1/2004 | Geis | B60K 6/28 180/65.22 |
| 7,148,649 | B2 * | 12/2006 | Ganev | H02J 3/24 318/701 |
| 7,172,474 | B2 | 2/2007 | Rzadki et al. | |
| 7,227,273 | B2 * | 6/2007 | Ahmad | B60K 6/46 290/40 C |
| 7,304,445 | B2 * | 12/2007 | Donnelly | B60L 7/06 180/65.265 |
| 7,336,000 | B2 * | 2/2008 | Stahlhut | F01N 5/04 290/40 C |
| 7,439,634 | B2 * | 10/2008 | Michalko | H02J 4/00 307/43 |
| 7,513,119 | B2 * | 4/2009 | Zielinski | F02C 7/262 60/204 |
| 7,514,807 | B2 * | 4/2009 | Donnelly | B60L 7/06 290/40 C |
| 7,518,254 | B2 * | 4/2009 | Donnelly | B60L 7/06 290/1 A |
| 7,541,687 | B2 * | 6/2009 | Stahlhut | H02P 9/00 290/52 |
| 7,554,278 | B2 * | 6/2009 | Wegner-Donnelly | B66C 13/18 187/277 |
| 7,565,867 | B2 * | 7/2009 | Donnelly | B60L 9/22 105/26.05 |
| 7,576,443 | B2 * | 8/2009 | Raju | B60L 11/08 290/40 F |
| 7,781,904 | B2 * | 8/2010 | Stahlhut | H02P 9/00 290/52 |
| 7,800,245 | B2 * | 9/2010 | Michalko | H02J 5/00 307/19 |
| 7,836,633 | B2 * | 11/2010 | Wilcox | B63B 21/56 47/1.01 R |
| 7,886,669 | B2 * | 2/2011 | Kumar | B60L 11/02 105/26.05 |
| 7,905,055 | B2 * | 3/2011 | Wilcox | B63B 21/56 47/1.01 R |
| 7,906,862 | B2 * | 3/2011 | Donnelly | B60L 7/06 290/40 C |
| 8,062,081 | B2 * | 11/2011 | Barrett | B63H 21/20 440/1 |
| 8,102,071 | B2 * | 1/2012 | Catlin | F03B 13/264 290/54 |
| 8,118,627 | B2 * | 2/2012 | Wejrzanowski | B63H 21/17 322/24 |
| 8,136,756 | B2 * | 3/2012 | Duces | H02J 3/02 244/58 |
| 8,159,082 | B2 * | 4/2012 | Gemin | B63H 21/20 307/64 |
| 8,244,419 | B2 * | 8/2012 | Wegner-Donnelly | B63H 23/24 105/61 |
| 8,299,638 | B2 * | 10/2012 | Sandoy | B63H 23/24 290/4 R |
| 8,421,266 | B2 * | 4/2013 | Kumar | B60L 1/00 105/35 |
| 8,674,535 | B2 * | 3/2014 | Arlitt | F03B 13/10 290/43 |
| 8,772,962 | B2 * | 7/2014 | Kumar | B60L 1/00 105/35 |
| 8,820,677 | B2 * | 9/2014 | Rajashekara | B64D 41/00 244/53 R |
| 8,866,334 | B2 * | 10/2014 | Donnelly | H02J 1/10 290/2 |
| 8,963,356 | B2 * | 2/2015 | Roos | F03B 3/04 290/52 |
| 9,118,206 | B2 * | 8/2015 | Peterson | H01H 11/00 |
| 9,163,607 | B2 * | 10/2015 | Tabe | F03B 13/262 |
| 9,166,510 | B1 | 10/2015 | Himmelmann | |
| 9,379,542 | B2 * | 6/2016 | Lovercheck | B60L 1/003 |
| 9,381,990 | B2 * | 7/2016 | Settemsdal | B60L 7/14 |
| 9,389,145 | B2 * | 7/2016 | Andreae | G01M 15/102 |
| 9,419,545 | B2 * | 8/2016 | Dakhil | H02N 2/185 |
| 9,611,981 | B2 * | 4/2017 | Billig | F17C 7/00 |
| 9,745,951 | B1 * | 8/2017 | Doyle | F03B 15/06 |
| 9,784,194 | B2 * | 10/2017 | Fisher | F02D 41/0027 |
| 10,202,178 | B2 * | 2/2019 | Himmelmann | H02K 11/33 |
| 10,414,477 | B2 * | 9/2019 | Himmelmann | F42B 19/22 |
| 2002/0158472 | A1 * | 10/2002 | Robson | F03B 17/061 290/43 |
| 2005/0179264 | A1 * | 8/2005 | Ganev | H02J 3/24 290/40 C |
| 2005/0223711 | A1 | 10/2005 | Goldmeer et al. | |
| 2006/0061213 | A1 * | 3/2006 | Michalko | H02J 4/00 307/9.1 |
| 2006/0061307 | A1 * | 3/2006 | Donnelly | B60L 7/06 318/108 |
| 2006/0131888 | A1 * | 6/2006 | Ahmad | B60K 6/46 290/40 C |
| 2006/0168968 | A1 * | 8/2006 | Zielinski | F02C 7/262 60/778 |
| 2007/0267540 | A1 * | 11/2007 | Atkey | B64D 13/06 244/58 |
| 2008/0048497 | A1 * | 2/2008 | Donnelly | B66C 13/18 307/19 |
| 2008/0143182 | A1 * | 6/2008 | Raju | B60L 11/08 307/26 |
| 2008/0148993 | A1 * | 6/2008 | MacK | B60L 9/00 105/35 |
| 2008/0258467 | A1 * | 10/2008 | Wilson | F03B 11/02 290/54 |
| 2009/0015063 | A1 * | 1/2009 | Michalko | H02J 5/00 307/19 |
| 2009/0140524 | A1 * | 6/2009 | Kejha | F03B 13/264 290/54 |
| 2009/0156068 | A1 * | 6/2009 | Barrett | B63H 21/20 440/3 |
| 2009/0193715 | A1 * | 8/2009 | Wilcox | A01G 33/00 47/59 R |
| 2009/0230686 | A1 * | 9/2009 | Catlin | F03B 13/264 290/54 |

(56) References Cited

U.S. PATENT DOCUMENTS

| | | | | |
|---|---|---|---|---|
| 2009/0288577 | A1* | 11/2009 | Kumar | B60L 11/02 105/36 |
| 2010/0060076 | A1* | 3/2010 | Gemin | B63H 21/20 307/9.21 |
| 2010/0094490 | A1* | 4/2010 | Alston | B63H 21/17 701/21 |
| 2010/0105259 | A1* | 4/2010 | Wejrzanowski | B63H 21/17 440/3 |
| 2010/0109325 | A1* | 5/2010 | Hupe | F03B 13/10 290/31 |
| 2010/0193630 | A1* | 8/2010 | Duces | H02J 3/02 244/58 |
| 2010/0244450 | A1* | 9/2010 | Tabe | F03B 13/262 290/53 |
| 2010/0304920 | A1* | 12/2010 | Simon | B60W 20/00 477/3 |
| 2010/0319252 | A1* | 12/2010 | Wilcox | A01G 33/00 47/59 R |
| 2011/0080040 | A1 | 4/2011 | Kumar | |
| 2011/0148117 | A1* | 6/2011 | Bailey | F03B 3/04 290/52 |
| 2011/0215641 | A1* | 9/2011 | Peterson | H01H 11/00 307/23 |
| 2011/0273009 | A1* | 11/2011 | Kumar | B60L 1/00 307/9.1 |
| 2011/0283931 | A1* | 11/2011 | Moldovanu | B63G 8/00 114/312 |
| 2011/0307127 | A1* | 12/2011 | Swenson | F02B 37/16 701/21 |
| 2012/0191265 | A1* | 7/2012 | Keir | F03B 15/08 700/287 |
| 2012/0256422 | A1* | 10/2012 | Fradella | H02K 1/2793 290/55 |
| 2012/0318914 | A1* | 12/2012 | Rajashekara | B64D 41/00 244/58 |
| 2013/0009469 | A1* | 1/2013 | Gillett | H02J 3/30 307/25 |
| 2013/0193750 | A1* | 8/2013 | Kumar | B60L 1/00 307/9.1 |
| 2013/0214533 | A1* | 8/2013 | Hupe | F03B 13/10 290/43 |
| 2013/0214596 | A9* | 8/2013 | Peterson | H01H 11/00 307/23 |
| 2013/0231806 | A1* | 9/2013 | Bailey | F02B 37/16 701/21 |
| 2013/0232941 | A1* | 9/2013 | Huang | F02C 7/32 60/39.24 |
| 2013/0307444 | A1* | 11/2013 | Settemsdal | B60L 7/14 318/139 |
| 2013/0313894 | A1* | 11/2013 | Settemsdal | H02J 4/00 307/9.1 |
| 2014/0102187 | A1* | 4/2014 | Andreae | G01M 15/102 73/114.71 |
| 2014/0139016 | A1* | 5/2014 | Lovercheck | B60L 1/003 307/9.1 |
| 2015/0214862 | A1* | 7/2015 | Dakhil | H02N 2/185 290/53 |
| 2015/0283908 | A1 | 10/2015 | Himmelmann | |
| 2016/0023773 | A1 | 1/2016 | Himmelmann et al. | |
| 2016/0257416 | A1 | 9/2016 | Himmelmann et al. | |
| 2016/0304214 | A1 | 10/2016 | Himmelmann et al. | |
| 2016/0365810 | A1 | 12/2016 | Armstrong et al. | |
| 2017/0077759 | A1* | 3/2017 | Niizuma | H02J 50/40 |
| 2017/0110883 | A1* | 4/2017 | Tabe | F03B 13/00 |
| 2017/0291712 | A1* | 10/2017 | Himmelmann | B64D 27/24 |
| 2018/0118356 | A1* | 5/2018 | Armstrong | B64D 27/24 |
| 2018/0370606 | A1* | 12/2018 | Himmelmann | H02K 11/33 |
| 2018/0370607 | A1* | 12/2018 | Himmelmann | H02K 11/33 |
| 2018/0370608 | A1* | 12/2018 | Himmelmann | H02K 7/1823 |
| 2018/0371994 | A1* | 12/2018 | Himmelmann | F02C 9/26 |

OTHER PUBLICATIONS

European Search Report for Application No. 18179556.8 dated Oct. 18, 2018.

* cited by examiner

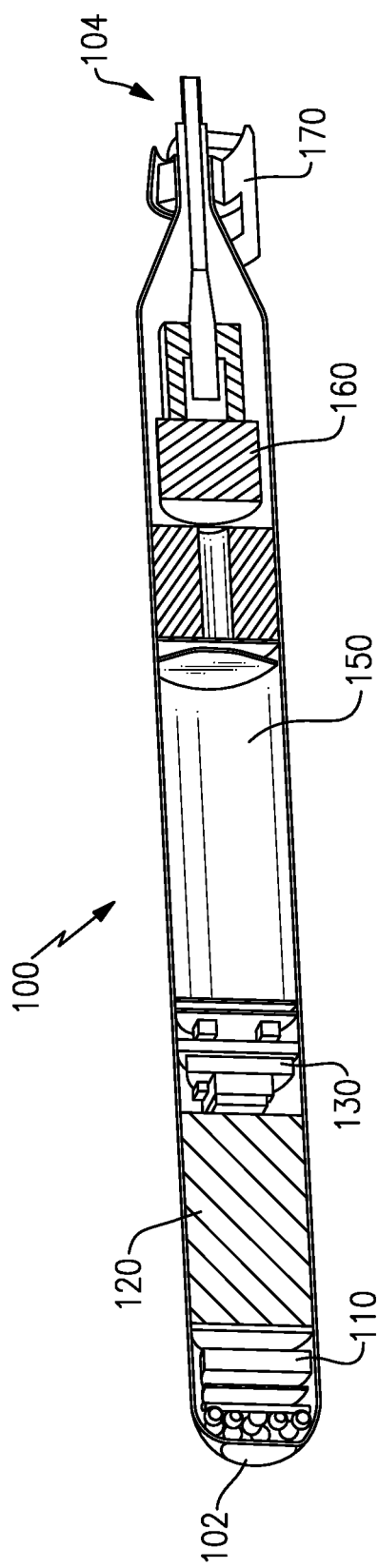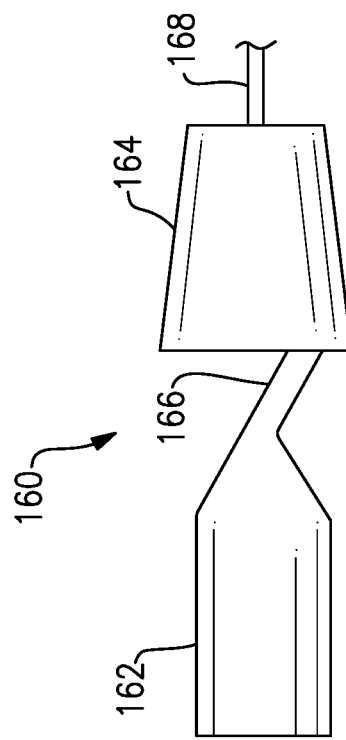
FIG.1
FIG.2

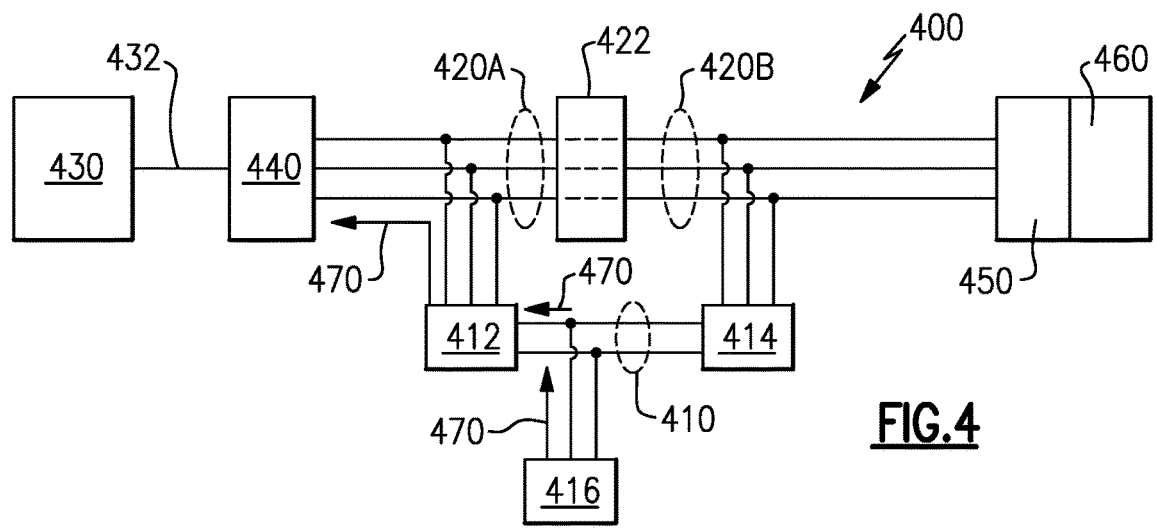
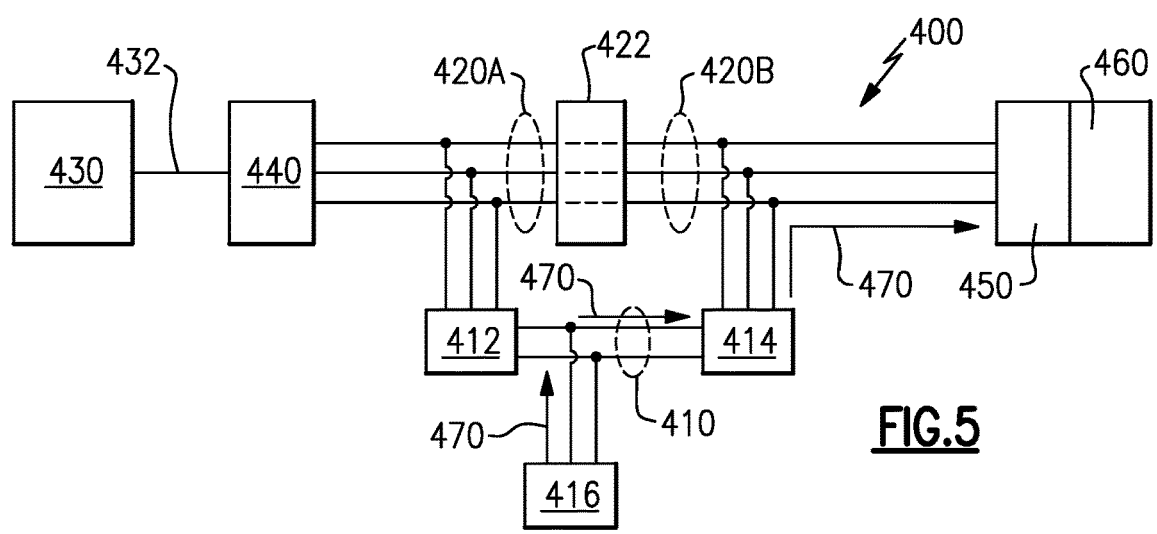
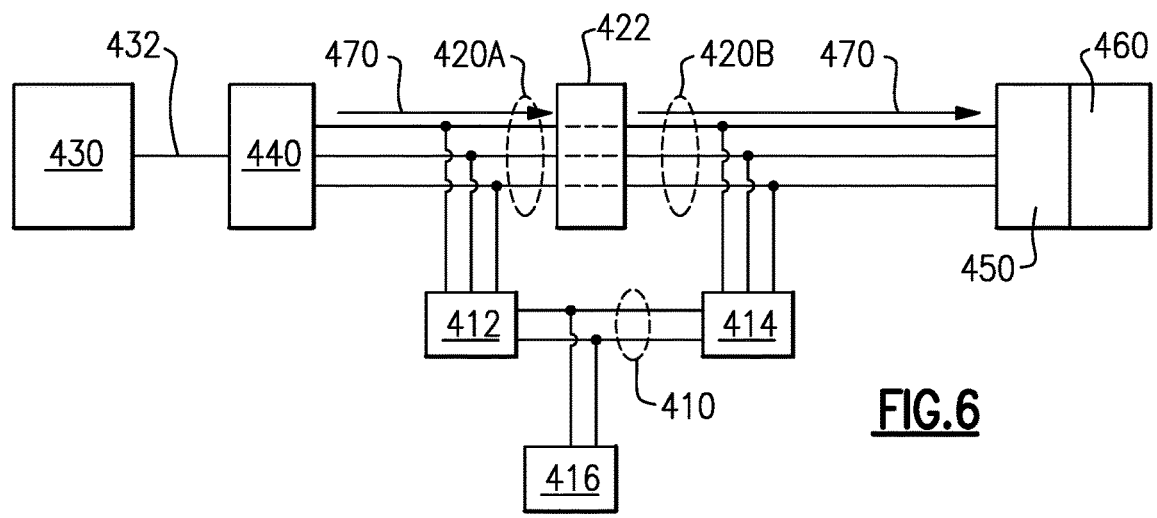

SERIES HYBRID ARCHITECTURE FOR AN UNMANNED UNDERWATER VEHICLE PROPULSION SYSTEM

TECHNICAL FIELD

The present disclosure relates generally to propulsion systems for unmanned underwater vehicles, and more specifically to a series hybrid architecture for the same.

BACKGROUND

Unmanned underwater vehicles, such as torpedoes, can be deployed from submarines, aircraft, ships, or any similar deployment platform. Once deployed, the unmanned underwater vehicle is propelled towards a target. Historically, unmanned underwater vehicles have been propelled by many different power sources included liquid fuel (such as Otto Fuel) engines, electric motors and batteries, electric motors and fuel cells, chemically heated steam engines, compressed gas engines, and solid rocket motors.

Maximizing an effective range, while also maintaining a sprint speed (maximum high speed) capability, is one goal of unmanned underwater vehicle design, and is impacted by the type of power source utilized to achieve propulsion. The longer the unmanned underwater vehicle's range, the further the deployment platform can be from the target of the unmanned underwater vehicle, protecting the safety of the deployment platform. In addition to the range, a high sprint speed allows the unmanned underwater vehicle to overtake a moving target once the moving target has been alerted to the unmanned underwater vehicle's presence. As is appreciated in the art, most engine configurations trade off effective range for a higher sprint speed, or sprint speed for a higher effective range.

SUMMARY OF THE INVENTION

In one exemplary embodiment a propulsion system for an unmanned underwater vehicle includes a turbine engine, a generator mechanically coupled to an output shaft of the turbine engine, an electrical motor mechanically decoupled from the turbine engine and electrically coupled to the generator via a power bus architecture, a propulsor mechanically coupled to a rotational output of the electrical motor, and wherein the power bus architecture includes a pair of AC buses and a DC bus.

In another example of the above described propulsion system for an unmanned underwater vehicle the pair of AC buses includes a set of power contactors configured to join the pair of AC buses.

In another example of any of the above described propulsion systems for an unmanned underwater vehicle the DC bus is connected to a first AC bus in the pair of AC buses via a first rectifier/inverter on a generator side of the power contactors.

In another example of any of the above described propulsion systems for an unmanned underwater vehicle the first rectifier/inverter is a bi-directional rectifier/inverter.

In another example of any of the above described propulsion systems for an unmanned underwater vehicle the first rectifier/inverter is an active rectifier/inverter.

Another example of any of the above described propulsion systems for an unmanned underwater vehicle further includes a contactor disposed between the first rectifier/inverter and the first AC bus, the contactor being configured to electrically isolate the first rectifier/inverter from the first AC bus.

In another example of any of the above described propulsion systems for an unmanned underwater vehicle the DC bus is connected to a second AC bus in the pair of AC buses via a second rectifier/inverter on a motor side of the power contactors.

Another example of any of the above described propulsion systems for an unmanned underwater vehicle further includes a low power energy storage system electrically coupled to the DC bus.

In another example of any of the above described propulsion systems for an unmanned underwater vehicle the low power energy storage system includes at least one of a chemical battery, a lithium ion battery, an ultracapacitor, and a fuel cell stack.

In another example of any of the above described propulsion systems for an unmanned underwater vehicle the motor is an induction motor.

In another example of any of the above described propulsion systems for an unmanned underwater vehicle the pair of AC buses are three phase AC buses.

In another example of any of the above described propulsion systems for an unmanned underwater vehicle the propulsion system is disposed in a torpedo.

An exemplary method for driving an unmanned underwater vehicle propulsion system includes providing power from an electrical energy storage system to a generator via a DC bus and a pair of AC buses in an engine start mode, providing power from the electrical energy storage system to a motor via the DC bus and the pair of AC buses in a range mode, and providing power from the generator to the motor via the pair of AC buses in a sprint mode.

Another example of the above described exemplary method for driving an unmanned underwater vehicle propulsion system further includes transitioning from the engine start mode to the range mode by opening a first rectifier/inverter connecting the DC bus to a first AC bus in the pair of AC buses, and closing a second rectifier/inverter connecting the DC bus to a second AC bus in the pair of AC buses.

Another example of any of the above described exemplary methods for driving an unmanned underwater vehicle propulsion system further includes a set of contactors configured to join the pair of AC buses, and wherein the first rectifier/inverter is connected to the first AC bus on a generator side of the contactors and the second rectifier/inverter is connected to the second AC bus on a motor side of the contactors.

Another example of the above described exemplary method for driving an unmanned underwater vehicle propulsion system further includes transitioning from the range mode to the sprint mode by opening a second rectifier/inverter and closing a set of contactors configured to join the pair of AC buses.

Another example of the above described exemplary method for driving an unmanned underwater vehicle propulsion system further includes controlling a propulsor speed while in the sprint mode by adjusting a voltage output of the generator.

In one exemplary embodiment a torpedo includes at least one fuel storage tank, a turbine engine including a combustor and a turbine, the combustor being fluidly connected to the at least one fuel storage tank, a generator mechanically coupled to an output shaft of the turbine engine, an electrical motor mechanically decoupled from the turbine engine and electrically coupled to the generator via a power bus architecture, a propulsor mechanically coupled to a rotational output of the electrical motor, and wherein the power bus architecture includes a pair of AC buses and a DC bus connected to the pair of AC buses via a first and second rectifier/inverter.

Another example of the above described torpedo further includes a controller configured to control at least one of the turbine engine, the generator, and the electrical motor.

Another example of any of the above described torpedoes further includes an electrical energy storage system connected to the DC bus, and configured to provide turbine start power in an engine start mode and propulsor power in at least a range mode.

These and other features of the present invention can be best understood from the following specification and drawings, the following of which is a brief description.

BRIEF DESCRIPTION OF THE DRAWINGS

FIG. 1 illustrates a high level schematic view of an exemplary unmanned underwater vehicle including a propulsion system.

FIG. 2 schematically illustrates an exemplary gas powered turbine for utilization in the unmanned underwater vehicle of FIG. 1.

FIG. 4 schematically illustrates an exemplary series hybrid propulsion system in a start mode of operations.

FIG. 5 schematically illustrates an exemplary series hybrid propulsion system in a range mode of operations.

FIG. 6 schematically illustrates an exemplary series hybrid propulsion system in a sprint mode of operations.

DETAILED DESCRIPTION OF AN EMBODIMENT

Figure 3:
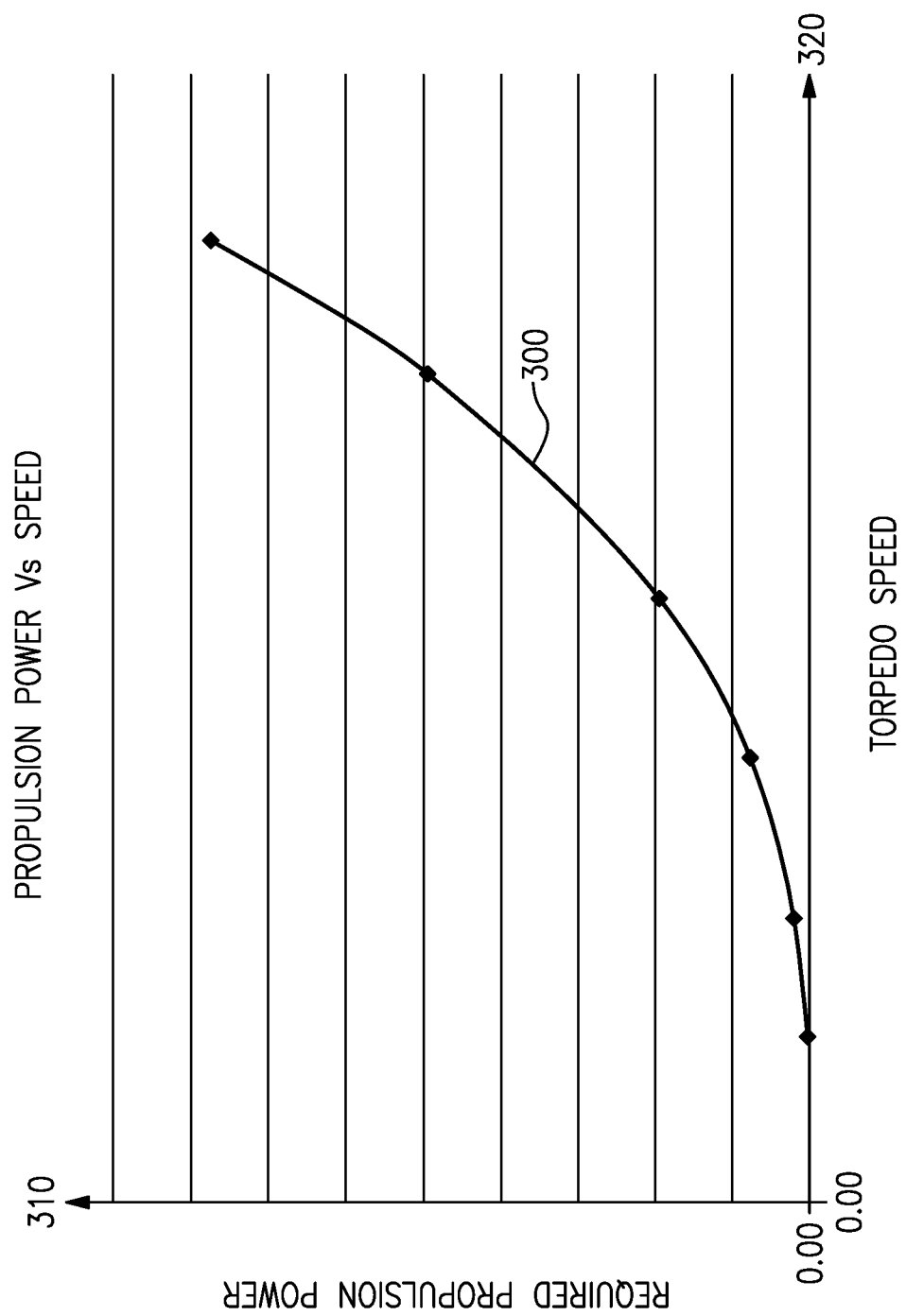
FIG. 3 illustrates a propulsion power vs. speed chart of an exemplary unmanned underwater vehicle.

FIG. 1 schematically illustrates a cross sectional view of an exemplary unmanned underwater vehicle 100. A forward end 102 of the unmanned underwater vehicle 100 includes a navigation system 110, a payload 120, such as a warhead, and control electronics 130. A mid-section of the unmanned underwater vehicle 100 includes fuel storage tank 150. Alternative example unmanned underwater vehicles utilizing multiple fuel types can include two or more distinct fuel storage tanks, each corresponding to its own fuel type. A rear end 104 of the unmanned underwater vehicle 100 includes a gas turbine engine 160 and a propulsor 170.

With continued reference to FIG. 1, and with like numerals indicating like elements, FIG. 2 schematically illustrates an exemplary gas turbine engine 160, such as could be utilized in the unmanned underwater vehicle 100 of FIG. 1. The gas turbine engine 160 includes a combustor 162 connected to a partial admission axial turbine 164 via a supersonic nozzle 166. Rotational motion generated by the partial admission axial turbine 164 is output via an output shaft 168. In some examples, the output shaft 168 is directly connected to the propulsor 170 (illustrated in FIG. 1), and directly drives rotation of the propulsor 170. In alternative configurations, the output shaft 168 is connected to the propulsor 170 via a geared connection. In the alternative configuration, the geared connection allows a controller, such as the control electronics 130, to adjust the speed at which the propulsor 170 is rotated, thereby controlling the speed of the unmanned underwater vehicle 100. In yet further alternative examples, the output shaft 168 can be connected to alternative systems, such as electrical generators, in addition to or instead of directly to the propulsor 170.

Once launched, the turbine engine 160 converts chemical energy from the fuel in the fuel storage tank 150 into mechanical energy by combusting the fuel in a combustor 162 to produce high temperature gas, referred to as a combustion product. The combustion product is expelled through the supersonic nozzle 166 into the partial admission axial turbine 164. The turbine 164 converts the high speed, high temperature, gas into a rotational power which drives rotation of the output shaft 168. The output shaft 168 is connected to the propulsor 170. In the alternative examples utilizing two fuel types, fuel in the first fuel storage tank 150 and an oxidizer in a second tank are mixed in the combustor 162 and combusted. The control electronics 130 control the operations of the turbine engine 160, as well as any directional controls, or other electronic systems onboard the unmanned underwater vehicle 100. Further, alternative examples utilizing alternative turbine configurations from the described and illustrated partial admission axial turbine 164 can be utilized FIG. 3 illustrates an exemplary propulsion power vs. speed curve 300 of the exemplary unmanned underwater vehicle 100. As can be seen, the curve 300 is non-linear, and the amount of propulsion power (axis 310) required to increase the speed of the unmanned underwater vehicle (axis 320) by a given amount increases exponentially as the current speed of the unmanned underwater vehicle 100 increases. The specific curve 300 illustrated in FIG. 3 is purely exemplary in nature and does not include actual unmanned underwater vehicle propulsion power or speed values. During operation the propulsion power of an unmanned underwater vehicle is related to the unmanned underwater vehicle's forward speed. In order for an unmanned underwater vehicle to operate properly at a very high sprint speed (i.e. with a high maximum velocity), the gas turbine engine 160 has to be capable of providing a very large power level. In order to achieve the exponentially higher power output required for an unmanned underwater vehicle at sprint speed exponentially more fuel must be expended.

Due to the specific power requirements of the unmanned underwater vehicle 100, operation of the unmanned underwater vehicle 100 at slower speeds can increase the range of the unmanned underwater vehicle 100, by requiring less of the fuel to be expended to cover the same distance. Certain combustion engines powered by liquid fuels, such as Otto Fuel, are very efficient at their maximum power design point, allowing for high speed operation, however their efficiency degrades at lower power levels resulting in less fuel saved by operating at low speed than if the combustion engine could maintain a high efficiency while operating at low power. This phenomenon yields a reduction in underwater vehicle range.

In some examples, such as a series hybrid propulsion architecture, it is desirable to mechanically decouple the propulsor 170 from the turbine engine 160. With continued reference to FIG. 1, FIG. 4 schematically illustrates an exemplary series hybrid propulsion system 400 including a direct current (DC) bus 410 and a pair of alternating current (AC) buses 420A, 420B in an engine start mode. Similarly, FIG. 5 schematically illustrates the exemplary series hybrid propulsion system 400 in a range mode of operations, and FIG. 6 schematically illustrates the exemplary series hybrid propulsion system 400 in a sprint mode of operations. A turbine engine 430, such as the turbine engine 160 of FIG. 1, includes a mechanical output 432 connected to an electrical generator 440. The electrical generator 440 is, in some examples, a voltage controlled permanent magnet generator. In alternative examples, the electrical generator 440 can be any type of voltage controlled generator.

The electrical generator 440 outputs poly phase AC power to the first AC bus 420A. Connected to the second AC bus 420B is a motor 450, such as an induction motor. The motor 450 receives poly phase power from the pair of AC buses 420A, 420B and drives rotation of a propulsor 460 that is mechanically connected to the motor 450. A set of power contactors 422 are disposed between, and connect, the AC buses 420A, 420B. While the power contactors 422 are in an open state, the AC buses 420A and 420B are disconnected, and are incapable of transmitting power directly from the voltage controlled generator 440 to the induction motor 450. While the power contactors 422 are in a closed state, the pair of AC buses 420A, 420B are joined to form a single AC bus 420 and pass power directly from the generator 440 to the motor 450. In the example propulsion system 400, three phase power is utilized. In alternative systems, any number of balanced phases can be utilized to similar effect.

Also present in the series hybrid propulsion system 400 is a DC bus 410. The DC bus 410 is connected to the first AC bus 420A via a first bi-directional inverter/rectifier 412 and a to the second AC bus 420B via a second bi-directional inverter/rectifier 414. A low power energy storage system 416, such as a chemical battery, lithium ion battery, ultra-capacitor, fuel cell stack, and the like, is connected to the DC bus 410 and can provide DC power to the DC bus 410, or the low power energy storage system 416 can store excess power from the DC bus.

During the engine start mode, the power contactors 422 are open, resulting in a disconnect between the pair of AC buses 420A, 420B. The first bi-directional rectifier/inverter 412 connecting the DC bus 410 to the first AC bus 420A is enabled, and an electrical flow 470 originates from the low power energy storage system 416. The DC power from the DC bus 410 is converted into AC power by the bi-directional rectifier/inverter 412 and provided to the first AC bus 420A on a turbine side of the power contactors 422. The AC power is then provided from the first AC bus 420A to the generator 440. By providing AC electrical power to the generator 440, the generator 440 is operated in a motor mode, and drives initial rotation of the turbine engine 430. Once fully operating, the turbine engine 430 is self-sustaining, and the generator 440 ceases operations in the motor mode.

During the range mode of operations, the unmanned underwater vehicle 100 is operated at a low speed, and the energy required to drive the propulsor 460 is low enough that the propulsor 460 can be driven off of the low power energy storage system 416. To switch to range mode, the first bi-directional rectifier/inverter 412 is switched off, and the second bi-directional rectifier/inverter 414 is switched on and the power contactors 422 are maintained open. In alternative examples, where the unmanned underwater vehicle begins in ranged mode, the first bi-directional rectifier/inverter 412 begins in an off position. In this configuration, the DC bus 410 is connected to a propulsor side of the power contactors 422, and power flows from the low power energy storage system 416 to the DC bus 410. Power from the DC bus 410 is converted to AC at the second bi-directional rectifier/inverter 414 and provided to the second AC bus 420B. The second AC bus 420B provides the power to the propulsion motor 450, which converts the electrical power to a rotational motion that is used to drive the propulsor 460.

In one example, the maximum power that can be delivered by the low power energy storage system 416 through the DC bus 410 is approximately 20 kW. As the amount of power required to drive the propulsor 460 is dependent on the speed required by the unmanned underwater vehicle 100 (as illustrated in FIG. 3), when transitioning to a sprint mode substantially more power is required than can be stored in the low power energy storage system 416, or delivered by the DC bus 410. To transition to the sprint mode of operations, the controller starts the turbine engine, as described above, then closes the power contactors 422 causing the AC buses 420A, 420B to be joined. Joining the AC buses 420A, 420B, in turn directly connects the electrical generator 440 to the motor 450 along the electrical flow 470 illustrated in FIG. 6.

Once the generator 440 is directly connected to the motor 450, via the joined AC buses 420A, 420B, the speed of the motor 450 and the propulsion power of the propulsor 460 are controlled by controlling the amplitude of the voltage on the joined AC buses 420A, 420B. In this mode, when the speed of the unmanned underwater vehicle 100 is required to be increased, the controller causes the generator 440 to increase its output voltage. As the generator 440 increases the output voltage, the AC current flowing through the windings of the motor 450 is increased. The current flowing through the windings of the motor 450 causes a rotating magnetic field to be produced within the motor 450. The rotating magnetic field, in turn, drives rotation of the motor 450. As such, increasing the output voltage of the generator 440 increases the speed at which the unmanned underwater vehicle 100 is driven.

When the output voltage (for a given ac bus frequency) of the generator 440 is increased, the torque of the propulsion motor 450 will increase, driving the propulsor 460 to a higher speed. As this happens, the slip ratio (the ratio between the AC bus frequency, and the motor rotor rotational electrical frequency) of the motor 450 reduces. The reduction in slip ratio negates some of the effect of increasing the voltage. To compensate, the motor 450 increases in speed, but not directly proportional to the increase in voltage. The system controller then further increases the output voltage of the generator 440 automatically until the desired motor rotational speed is achieved. The induction motor 450 output torque is proportional to both the slip ratio and the ac bus voltage. The induction motor 450 output speed is proportional to the motor output torque minus the required torque of the propulsor 460, which is a function of the speed of the propulsor 460.

Some unmanned underwater vehicles, such as the live torpedo unmanned underwater vehicle 100 illustrated in FIG. 1, do not require recharging the low power energy storage system 416. In such examples, the rectifier/inverters 412, 414 can be maintained in connection with the pair of AC buses 420A, 420B during the sprint mode of operations. Due to the substantially higher powerflow across the pair of AC buses 420A, 420B during the sprint mode, exposure to the excessive power can cause the rectifier/inverters 412, 414 to burn out, or be destroyed. In such an example, the DC bus 410 is permanently disconnected from the pair of AC buses 420A, 420B.

In alternative examples, such as an exploratory drone, or a practice torpedo, destruction of the rectifier/inverters 412, 414 is undesirable. In such examples, when the rectifiers/inverters 412, 414 are active rectifier/inverters (e.g. are actively controlled switches), all the switches can be commanded to open as the propulsion system 400 enters the sprint mode. In alternative examples, where the rectifier/ inverters 412, 414 are passive rectifier/inverters, additional switching components can be included between the rectifier/inverters 412, 414 and the pair of AC buses 420A, 420B and can disconnected the rectifier/inverters 412, 414 from the pair of AC buses 420A, 420B upon transition to the sprint mode.

In yet further examples, the low power energy storage system 416 can be a rechargeable energy storage system, such as a rechargeable battery, an ultracapacitor, or any other rechargeable energy storage system.

While described above within the context of a torpedo 100, it should be understood that the propulsion system 400 can be included within any type of unmanned underwater vehicle, and is not limited to torpedo applications. It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for driving an unmanned underwater vehicle propulsion system comprising:
   providing power from an electrical energy storage system to a generator via a DC bus and a pair of AC buses in an engine start mode;
   providing power from the electrical energy storage system to a motor via the DC bus and the pair of AC buses in a range mode; and
   providing power from the generator to the motor via the pair of AC buses in a sprint mode.

2. The method of claim 1, further comprising transitioning from the engine start mode to the range mode by opening a first rectifier/inverter connecting the DC bus to a first AC bus in the pair of AC buses, and closing a second rectifier/inverter connecting the DC bus to a second AC bus in the pair of AC buses.

3. The method of claim 2, further comprising a set of contactors configured to join the pair of AC buses, and wherein the first rectifier/inverter is connected to the first AC bus on a generator side of the contactors and the second rectifier/inverter is connected to the second AC bus on a motor side of the contactors.

4. The method of claim 1, further comprising transitioning from the range mode to the sprint mode by opening a second rectifier/inverter and closing a set of contactors configured to join the pair of AC buses.

5. The method of claim 1, further comprising controlling a propulsor speed while in the sprint mode by adjusting a voltage output of the generator.

* * * * *